United States Patent [19]
Olson

[11] 3,764,852
[45] Oct. 9, 1973

[54] MOTOR CONTROL FOR IRRIGATION APPARATUS
[76] Inventor: Rich L. Olson, R. R. 1, Box 83, Scottsbluff, Nebr.
[22] Filed: June 9, 1972
[21] Appl. No.: 261,423

[52] U.S. Cl. ....... 317/13 A, 317/36 TD, 307/141.4, 317/141 R
[51] Int. Cl. ............................................ H02h 7/085
[58] Field of Search ........... 317/13 A, 13 R, 141 R, 317/36 TD; 318/484; 307/141.4

[56] References Cited
UNITED STATES PATENTS
2,444,295   6/1948   Kaiser .............................. 317/13 A Primary Examiner—J. D. Miller
Assistant Examiner—Harvey Fendelman
Attorney—McDougall, Hersh & Scott

[57] ABSTRACT

To provide for an automatic restart of an irrigation system after a power failure and the motor has stopped a motor driven adjustable timer closes a contact after a preset time interval. The contact completes a circuit in a control panel effective to cause the system to resume operation.

3 Claims, 3 Drawing Figures

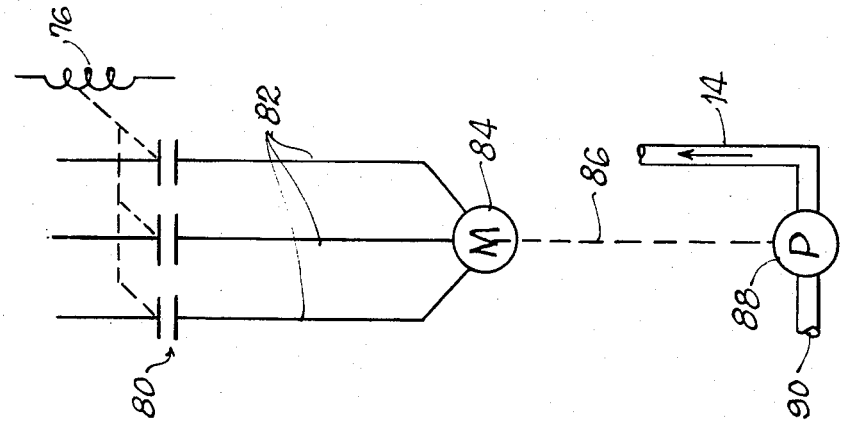
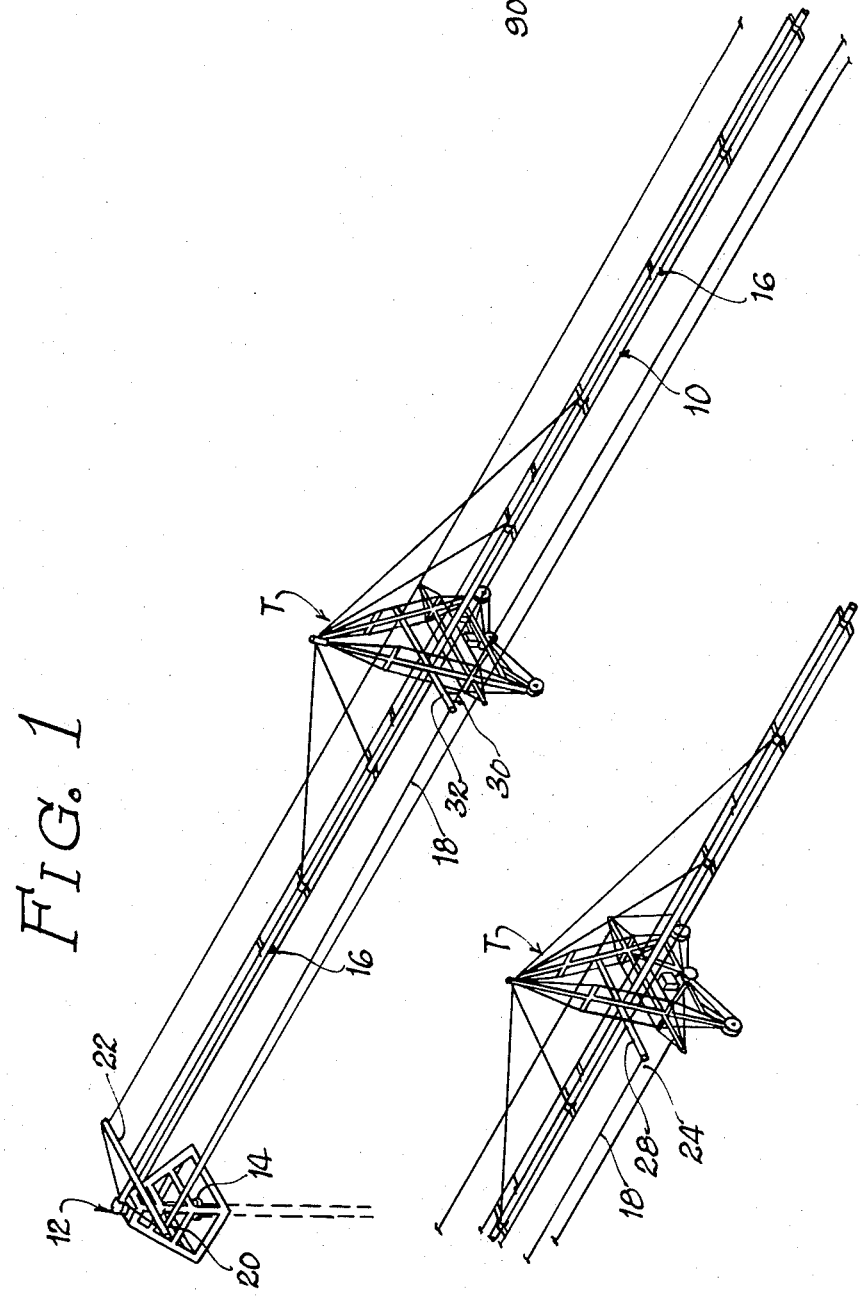

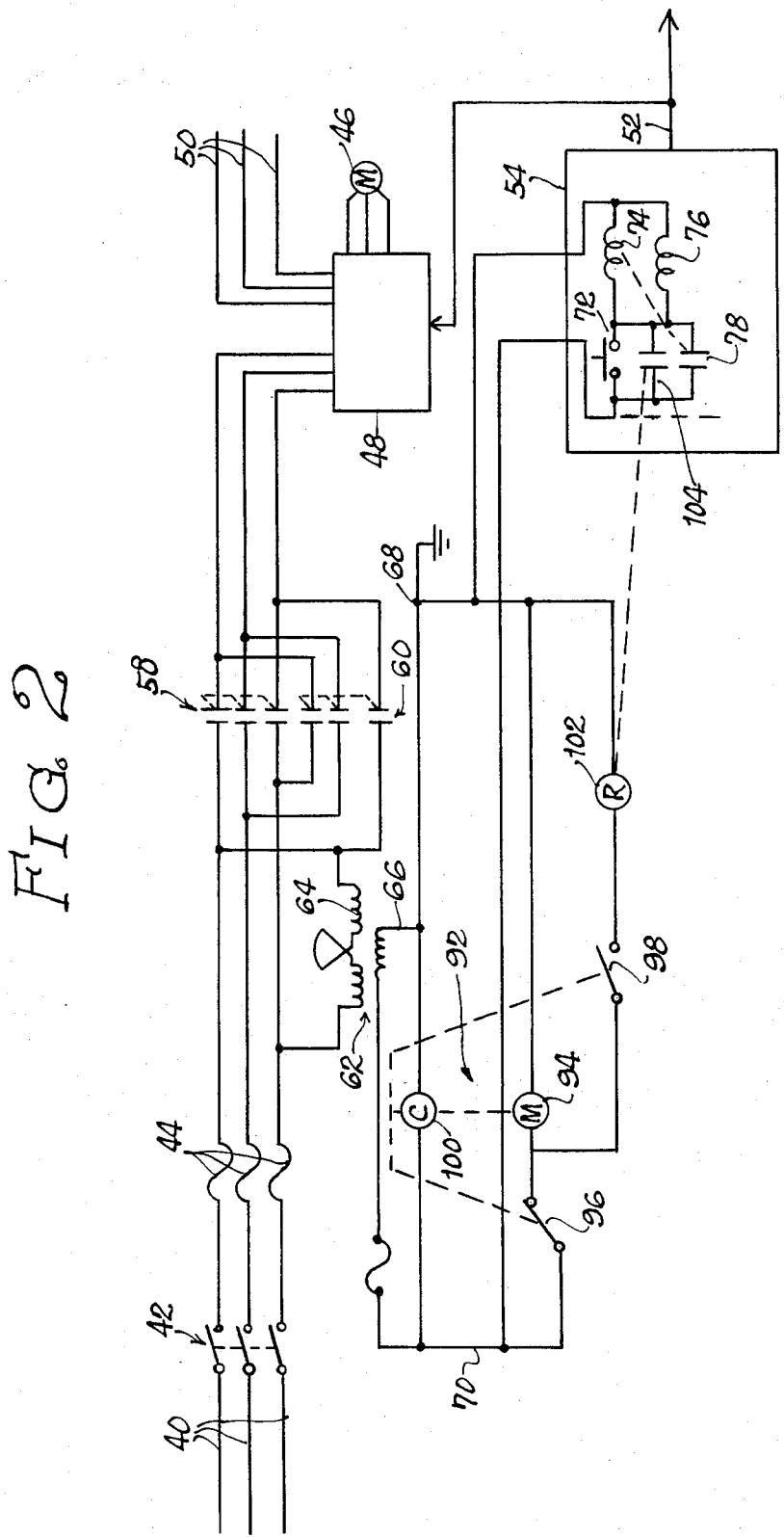

MOTOR CONTROL FOR IRRIGATION APPARATUS

BACKGROUND OF THE INVENTION

This invention relates generally to improvements in irrigation apparatus. More specifically, it relates to improvements in the circuit for controlling the pump motor forming a part of such apparatus.

Irrigation systems drawing upon water pumped from wells have come into extensive usage. The water so pumped may be supplied to either a mobile or stationary system. In a typical mobile system use is made of a main distributor which may be as much as one-half mile in length. An inner end of the pipe is connected to a water source, that is, a pipe extending into the ground connected in turn to the outlet of a submerged centrifugal pump to provide a source of water under pressure to sprinkling heads along the length of the pipe for sprinkling the water on crops in a field being irrigated. Usually, the distributor pipe is mounted for rotation about a central pivot where the inner end is connected to the water source. A plurality of driven towers spaced along the distributor pipe support it and carry it across the field. A stationary irrigation system would include sections of pipe which are manually moved from one field section to another as desired.

Not infrequently, there are interruptions in the electrical systems supplying such systems. The interruptions can occur at any point in a utility company's distribution network as a result of lightning striking transformers or lines, overloads or simply because of equipment failure. On farms of the size wherein mobile irrigation systems of the type described are used the farm operator depends upon the control system to maintain and monitor the operation of his irrigation system and were its operation to be interrupted as the result of a power failure he might not even be aware of it and an irrigation schedule would be seriously disrupted and perhaps not even completed.

Insofar as the applicant is aware, while some prior art systems have provided for automatic restart of the pump motor under the circumstances described they have all provided for an instantaneous restart. It has been found that under certain conditions with instantaneous restart the system can be damaged. To appreciate this it must be understood the wells used to supply water may extend to depths of 300 to 600 feet. A motor at the top of the well, ranging from 50 to 300 horsepower, drives a turbine pump at the bottom of the well casing by means of a shaft extending downwardly through the casing and supported by bearings spaced over its length. While the motor is operating, the pump maintains a column of water of substantial length in the delivery pipe and of course more water is present in the irrigation system itself. If the motor should stop as the result of a power failure or otherwise, the water in the pump delivery pipe and probably that in the irrigation system will fall to the bottom of the well toward the pump with substantial force due to its weight and the fact that it is accelerating over a substantial distance. Were the pump motor to restart under these circumstances it would be attempting to restart and pump water in the face of a substantial load. The result could be damage to the pump or damage to the motor or both.

Another problem can arise when there is an attempt to instantaneously restart a pump motor as described, if the power failure was caused by lightning striking a portion of a utility's electrical distribution network, and the utility is working to reestablish that network or an alternate. If as switches are cutting back in and various circuit protectors are monitoring the load and one of the loads immediately appearing on the line is the demanding load of a relatively large electric motor, it is possible that the circuit protectors may cut out hampering the utility's ability to reestablish and stabilize the distribution network.

Accordingly, it is an object of this invention to provide a novel automatic circuit for restarting a pump motor after a power failure which by delaying the restarting for a time interval after power is restored enables a utility network supplying the pump motor to become stabilized before the motor is put on the line.

SUMMARY OF THE INVENTION

The foregoing and other objects are achieved by providing a motor contact circuit effective upon the restoration of power after a power failure to complete a circuit to an irrigation pump motor at a predetermined time after power has been restored.

BRIEF DESCRIPTION OF THE DRAWINGS

While the invention itself is defined in the claims forming a part of this specification, an understanding of the construction and mode of operation of an embodiment may be derived from the attached description taken in conjunction with the drawings in which:

FIG. 1 is a perspective view of a mobile irrigation system embodying the invention, showing the pivot end and the outer end section with the intervening portions omitted;

FIG. 2 is an illustration of a control circuit for a mobile irrigation system incorporating the invention; and FIG. 3 is a schematic diagram of a motor circuit controlled in accordance with the invention.

DETAILED DESCRIPTION

FIG. 1 illustrates a mobile irrigation system wherein a distribution pipe extends from a central pivot. However, it should be understood that the system illustrated is for purposes of exemplification only for it is contemplated that any irrigation system deriving water from a pumped well may be improved in accordance with the invention.

Referring now to the drawings for a description of the invention, the numeral 10 indicates the elongate horizontally disposed water distribution pipe which is provided with a swivel connection 12 at its inner end for pivotal attachment to the upper end of a feed pipe which may extend downwardly to a well in the ground or which is otherwise supplied with water under pressure for irrigation, as from a stream, well or other source of water. Thus, the feed pipe 14 represents the axis about which the water distributor pipe turns. Other means for pivotal attachment in sealing engagement between the distributor pipe and the feed pipe are well known by reason of the widespread utilization of such an arrangement in commercial practice.

The distributor pipe 10 is provided with a plurality of spray nozzles 16 at frequently spaced intervals along the length of the pipe for operation as overhead sprays to sprinkle water onto the crop as the distributor pipe moves about the feed as its axis. The distributor pipe is supplied with water under pressure, as by means of a water pump connected with a supply pipe or water tower.

A number of mobile towers T are arranged in longitudinally spaced apart relation along the length of the distributor pipe with means for engaging the adjacent portions of the pipe for support. The number of mobile towers T can be varied depending somewhat upon the spaced relationship between supports and the length of the distributor pipe. The distributor pipe 10 can be suspended from the support by means of a cable so as to be carried by the support.

To maintain automatic alignment of the towers a flexible cable 18 which is fixed at its inner end 20 to an arm 22 which extends laterally from the pivot while the outer end 24 is fixed to the end portion of a laterally extending cross beam 28 on the outermost tower so that the flexible cable 18 will extend in essentially a straight line from said pivot to said outermost tower.

The flexible cable is threaded through an opening in a pendulum 30 that is mounted on each of the intermediate towers for free rocking movement about an axis which is parallel with the axis of the pipe and in a direction crosswise of the distributor pipe. The pendulum 30 comprises an elongate member which is suspended to depend from the tower on a pivot pin extending laterally from the end portion of a horizontally disposed cross brace member 32 rigid with the tower.

When the intermediate mobile tower is in proper alignment, the pendulum will be suspended from its pivot to hang downwardly substantially perpendicularly so that the pendulum will be free of the plunger of a switch controlling the tower drive motors.

A control system in accordance with the invention is illustrated in FIG. 2. Power for the control system and for operation of the various components including the pump motor and tower motors is derived via a three wire three-phase connection 40 to the output of a three-phase distribution network. A manually-operated power disconnect 42 is provided for operation by a user when it is desired to connect or disconnect the system to the line. Conventional protection against thermal or current overload may be provided by fuses 44.

Supplied from the line 40 are the motors on each of the towers T, only one of which, 46, is shown, it being understood that each tower has a separate drive motor. Mounted on each tower is a control panel 48, which, forms no part of this invention but, is constituted by well known electrical devices effective to start and stop the tower motor 46 and connect the line 40 to the next tower by means of the conductors 50. Each tower control panel responds to timed control signals transmitted by means indicated at 52 from a control panel 54 mounted on or adjacent to the pivot tower. Basically, the signal from panel 54 determines the direction of rotation of the tower motors 46 and their time of operation. To this end the panel 54 includes forward and reverse relays (not shown) which also determine whether a switch 58 for forward operation or a switch 60 for reverse operation is to be closed.

Power for the pivot control panel 54 and tower control panels 48 is derived via a stepdown transformer 62, the primary 64 of which is connected across the line 40 while the secondary 66 is connected between a ground or neutral bus 68 and supply bus 70. In a preferred embodiment it is contemplated that line 40 may be supplied 460 volt three-phase 60 hz for the tower motors 46 when the output of the transformer is 120 volt single-phase 60 hz.

Included on the control panel 54 is a start switch 72 having at least one contact which when closed momentarily connects coils 74 and 76 across 70 and 68 to cause those coils to be energized. Other contacts associated with the switch 72 (not shown) cause other elements (not shown) in the control panel 54 to become appropriately energized so that the pivot towers will function as desired as the result of signals derived via 52.

The coil 74 is part of a relay and when energized closes a holding contact 78 to maintain a circuit shunting switch 72 which as stated is closed only momentarily. The coil 76 (see FIG. 3) may be the coil of pilot relay or the coil in a contactor 80 connected in a line 82 supplying a three-phase pump motor 84 and when energized closes the contactor to energize the motor. A shaft 86 from the motor 84 located at the well head drives a pump 88 having an intake 90. The pump output is connected to the pipe 14 which in turn is connected to the distributor pipe as described.

Referring again to FIG. 2, a control system in accordance with the invention includes a motor driven timer 92 comprising a timer motor 94 capable of operating a pair of contacts 96 and 98 through an electromagnetically controlled clutch 100. As may be seen, the clutch is connected in series with the transformer secondary 66 so as to be energized whenever the power disconnect 44 is closed and power is being supplied to the line 40. The motor 94 is in series with the contact 96 between the bus 70 and ground 68. A relay coil 102, operating a contact 104 shunting the start switch 72, is connected in series with contacts 96 and 98 between the bus 70 and ground 68.

The motor driven timer 92 can be of any one of a number of commercial devices arranged to operate the contacts 96 and 98 at predetermined times when the motor and clutch are energized. The particular arrangement used herein is one, when the clutch is energized and the motor runs because contact 96 is in the position shown, after a predetermined time interval fixed by setting a pointer on a dial, the contact 98 will close and the relay 102 will pick up and a short time later the contact 96 is opened to deenergize the motor and cause relay 102 to drop out. If the solenoid controlling the clutch 100 should drop because power to it is interrupted the contacts 96 and 98 will be automatically reset to positions shown in FIG. 2 by suitable return springs.

The time delay means just described operates to control the pump motor circuit as follows: The normally opened contact 104 forming a part of relay 102 shunts the start switch 72. When the relay 102 picks up the contact 104 closes energizing the coils 74 and 76. The energization of 74 closes contact 78 to complete a holding circuit while the energization of 76 closes the contactor 80 in the pump motor circuit so that pumping will commence.

Assuming system start-up under normal circumstances, the disconnect 42 is closed and the various settings on the control panel 54 are determined by the operator and he then depresses start switch 72 to put the system into operation. Prior to this because the clutch 100 was deenergized the contacts 96 and 98 were in the positions shown in FIG. 2. At the time disconnect 42 was closed the timer 92 began to time out because clutch 100 became energized as did the motor 94. After a predetermined time the switch 98 closes picking up relay 102 which in turn closed 104. However, nothing happens in the pump motor control circuit because the coil 76 had already been energized by closing the start switch 72 and the completion of the holding circuit through contact 78. A short time later a contact 98 closes, the contact 96 opens deenergizing the motor 94 and relay 102. At this point the system remains as is until the clutch 100 is deenergized and the contacts 96 and 98 are then reset to the positions shown. It is to be noted that the timer and the contacts controlled thereby cycle through once each time power is applied to the system and are reset upon interruption of power.

Assume therefore that system is operating with coils 74 and 76 energized through holding contact 78 and there is a power failure. Holding relay 74 drops out and clutch 100 is deenergized while disconnect 42 remains closed. The tower motors 46 and pump motor 88 stop and water begins to drain back into the well. When power is restored, clutch 100 is energized as is the motor 94. As before, after a predetermined time contact 98 closes, relay 102 closes contact 104, relays 74 and 76 pick up restarting the pump motor and putting the system back in operation.

For all the reasons stated previously the provision of a time delay after restoration of power is important and is provided hereby. As described, the time delay restart circuit cycles once for each power restoration. In addition, it is fail safe for the failure of any component will not cause the pump motor to start prior to a time intended.

Various modifications can be made in the invention without departing from the spirit thereof and it is intended by the claims to cover all modifications and changes from the embodiment disclosed, as come within their scope.

What is claimed as new and desired to be secured by Letters Patent is:

1. An irrigation system including: a water distribution means; means for connecting said distribution means to a source of water; a pump for pumping water through said connecting means and said distribution means; first means for connection to a source of electric power; an electric pump motor for driving said pump; a power circuit connected between said first means and said motor for supplying power to said motor; a control circuit; second means coupling said control circuit to said first means; said control circuit comprising a timer motor, an electromagnetic clutch connected to said second means and to said timer motor, first and second contact means connected to said clutch to be operated in response to the rotation of said timer motor, said first contact means connecting said timer motor to said second means to cause it to be energized when power is supplied from the source of electrical power and to cease operation when said first contact means has operated after a predetermined time interval in response to the rotation of the timer motor, said second contact means operating after a predetermined time interval in response to the operation of said timer motor to provide an output, and means connecting the output to said power circuit to cause said pump motor to be energized.

2. In the irrigation system of claim 1 wherein said output is constituted by a relay having a coil energized in response to operation of said second contact and whereby said means connecting said output to said power circuit comprises a relay contact controlled by said relay and a circuit controlled by said relay contact to close said power circuit to said pump motor.

3. In an irrigation system including: a motor distribution means; means for connecting said distribution means to a source of water; a pump for pumping water through said connecting means and said distribution means; an electric motor for driving said pump; a power circuit connected to said motor for supplying power to said motor; and a control circuit for controlling said power circuit; the improvement in said control circuit comprising a time delay circuit; said time delay circuit comprising an electromagnetically-controlled clutch; means for connecting said clutch to said power source whereby said clutch will be energized whenever power is available from the source; a timer motor having a shaft connected to said clutch; means for connecting one side of said motor to said power source; a first contact connecting the other side of said timer motor to said source; a relay; means for connecting one side of said relay to said source; a second contact; means for connecting the other side of said relay to said second contact; means for connecting said second contact to said first contact; said first and second contacts mounted to be operated when said clutch and said timer motor are energized; a relay contact operated by said relay; and control means operating in response to the closure of said relay contact to connect the power circuit to said motor.

* * * * *